United States Patent [19]

Zambrano

[11] 4,298,379
[45] Nov. 3, 1981

[54] PRODUCTION OF HIGH PURITY AND HIGH SURFACE AREA MAGNESIUM OXIDE

[75] Inventor: Adolfo R. Zambrano, Hibbing, Minn.

[73] Assignee: The Hanna Mining Company, Cleveland, Ohio

[21] Appl. No.: 117,224

[22] Filed: Jan. 31, 1980

[51] Int. Cl.$^3$ .......................... C01F 5/12; C25C 3/04; C22B 23/00; C22C 33/00
[52] U.S. Cl. .......................... 75/82; 23/304; 75/129; 204/70; 423/127; 423/147; 423/164; 423/166; 423/170; 423/635; 423/638
[58] Field of Search ............... 423/140, 147, 164, 166, 423/554, 555, 638, 127, 170, 635; 23/304; 204/70; 75/82, 129

[56] References Cited

U.S. PATENT DOCUMENTS

| | | | |
|---|---|---|---|
| 1,112,770 | 10/1914 | Clarke | 423/554 |
| 2,899,300 | 8/1959 | Bailey | 423/147 |
| 3,965,240 | 6/1976 | Hughey | 423/636 |
| 4,096,235 | 6/1978 | Cross et al. | 423/166 |
| 4,102,989 | 7/1978 | Wheelock | 423/638 |
| 4,125,588 | 11/1978 | Hansen et al. | 423/155 |

Primary Examiner—O. R. Vertiz
Assistant Examiner—Wayne A. Langel
Attorney, Agent, or Firm—Schwartz, Jeffery, Schwaab, Mack, Blumenthal & Koch

[57] ABSTRACT

Disclosed is a process for refining a magnesium and nickel containing ore, comprising the steps of grinding the ore; preparing a slurry of the ground ore in sulfuric acid containing less than ten percent of water; adding water to the acid-ore slurry in an amount which is effective to initiate a sulfation reaction; allowing the sulfation reaction to continue, utilizing the heat of the sulfation reaction to heat the acid-ore slurry, whereby water-soluble metal sulfates and insoluble residue are formed; leaching the sulfation product with water to extract the water-soluble metal sulfates in solution; separating the metal sulfates solution from the insoluble residue; precipitating from the solution metals other than Mg as hydroxides; separating the solution from the metal hydroxide precipitate; concentrating the solution sufficiently to precipitate $CaSO_4$; separating the concentrated solution from the precipitate; recovering dehydrated $MgSO_4$ crystals from the concentrated solution; and decomposing the dehydrated $MgSO_4$ crystals to form MgO of controlled surface area. Additionally disclosed are an autoclave step for reducing iron values in the metal sulfates solution, nickel or ferronickel recovery steps, a sulfuric-acid recycle; refractory MgO production steps, and Mg metal recovery steps.

22 Claims, 1 Drawing Figure

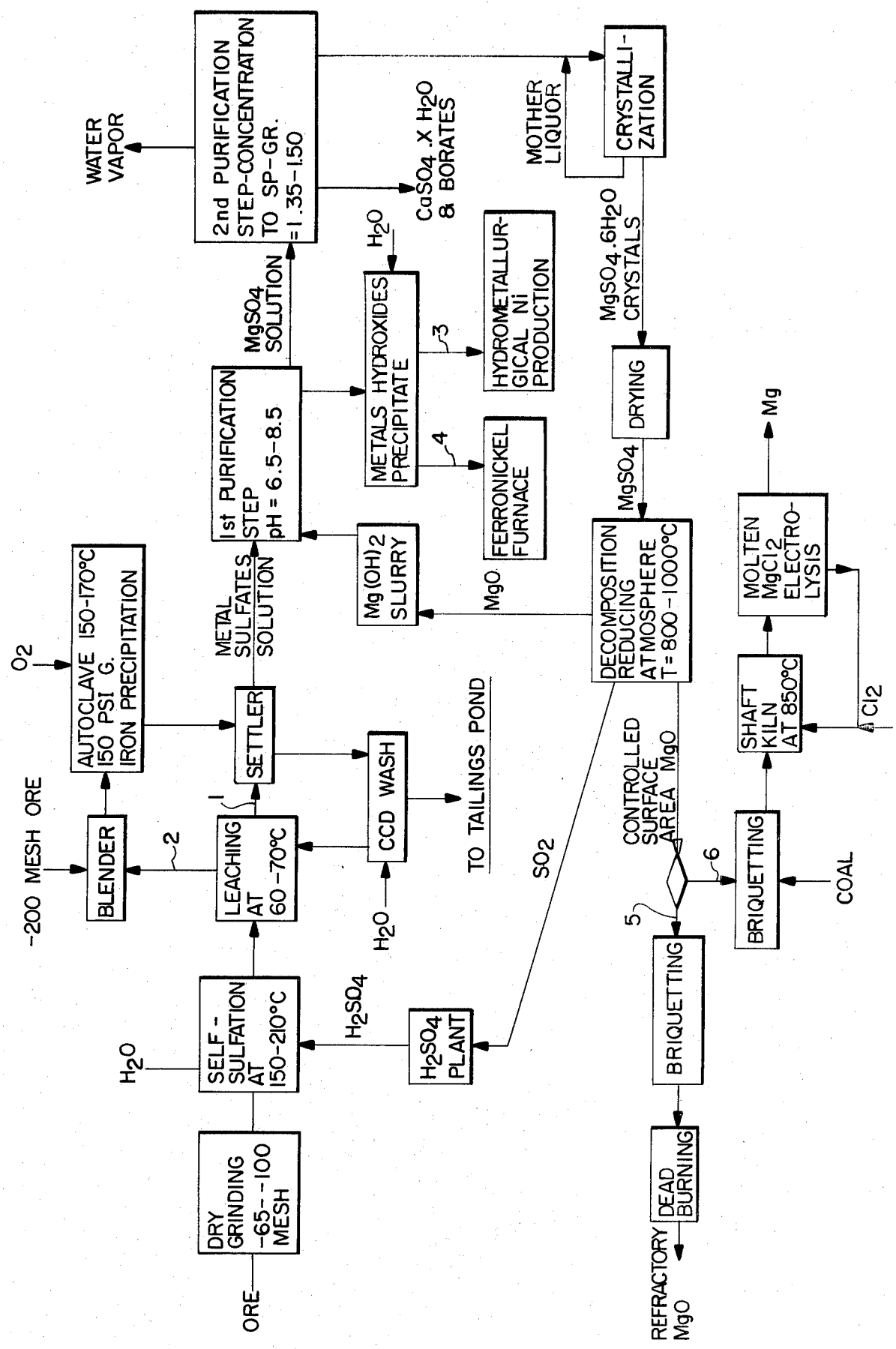

PRODUCTION OF HIGH PURITY AND HIGH SURFACE AREA MAGNESIUM OXIDE

BACKGROUND OF THE INVENTION

The present invention pertains to a process for recovering magnesium oxide and nickel from magnesium-bearing materials, and more particularly, to a process for recovering nickel and producing high purity, high surface area magnesium oxide (MgO) suitable for forming products for refractory applications.

Magnesium oxide is useful in the formation of materials for refractory applications, i.e., materials suitable for use at high temperatures, such as bricks for lining steel-making furnaces. Refractory magnesium oxide is formed by dead burning magnesium oxide at temperatures of about 2100° C. after briquetting at pressures exceeding 20,000 psi. It is desirable that the magnesium oxide feed for the briquetting and dead burning processes have both high purity and high surface area. In the prior art, additives have been used to render the MgO suitable for successful briquetting and densification. Because of the additives required, refractory MgO briquettes having the desired density and purity could not easily be formed.

High purity MgO is rare in nature. Naturally occurring magnesite suitable for refractory applications is costly and is becoming increasingly difficult to obtain.

At the same time, magnesium-containing materials of lesser purity abound. Magnesium is found in laterites, brines, sea water, dolomite, and many other materials. However, magnesium oxide is difficult to obtain in high purity from these materials because of the presence of other metals and impurities of similar properties, making physical or chemical separation difficult.

The prior art teaches the leaching of magnesium-containing ores with sulfuric acid to solubilize the metals, including magnesium, as sulfates. The metal sulfates solution is then subjected to various physical and chemical treatments to separate and purify the desired magnesium oxide. One prior art process, disclosed in U.S. Pat. No. 4,096,235, teaches neutralization of the metal sulfates solution with magnesia to precipitate impurities, such as iron, as hydroxides. The magnesium sulfate remaining is crystallized, dried and decomposed in a fluidized bed reactor to form solid magnesium oxide and sulfur dioxide gas. The $SO_2$ is then recycled to form $H_2SO_4$. However, the prior art has not considered the sulfate system suitable for the commercial production of refractory MgO.

One of the difficulties with this and other of the prior art processes is the necessity of utilizing starting materials of relatively high magnesium content, such as magnesite. This limitation results from the fact that the neutralization step which precipitates metals other than magnesium as hydroxides fails to remove significant amounts of borates, iron, calcium and silicates. Though lower purity starting materials can be used, the resulting lower purity MgO is less desirable for refractory applications. To achieve higher purity MgO from such starting materials, additional chemical purification and crystallization stages are required, greatly increasing the cost of the product.

Because of the low surface area characteristic of the MgO formed by the prior art processes, additives to the MgO are generally required prior to dead burning to allow successful briquetting and densification. Such additives increase the cost, and of course, decrease the purity of the resulting refractory material. The prior art does not teach a method for economically and consistently producing MgO of controlled surface area from $MgSO_4$.

Many magnesium containing ores, such as Oregon laterites, additionally contain significant amounts of nickel and iron. The recovery of iron and nickel from these ores has not heretofore been commercially practicable. However, if such recovery were possible, it could greatly enhance the profitability of refining such ores. Additionally, it is desirable that the more valuable nickel be recovered in a higher ratio relative to the iron than the naturally-occurring ratio of these elements in the unprocessed ore.

SUMMARY OF THE INVENTION

It is therefore an object of the present invention to provide an economical method of making high purity MgO from a metal sulfates solution derived from laterites or other inexpensive magnesium-containing raw materials.

Another object of this invention resides in the provision of a method for forming MgO of controlled surface area.

It is a further object of this invention to provide a commercially practicable method for recovering high nickel values from magnesium-containing raw materials which additionally contain iron and nickel.

Still another object of this invention resides in the provision of a method for forming MgO which, without additives, is suitable for dead burning and the formation of refractory material.

It is also an object of the invention to provide an improved method for producing refractory materials from inexpensive magnesium-containing raw materials.

Still another object of this invention resides in the provision of refractory MgO of higher density and higher purity than is now commercially available.

In accomplishing the foregoing objects, there has been provided in accordance with one aspect of the invention, a process for the recovery of nickel products and magnesium products from nickel and magnesium-containing ores, comprising the steps of:

(a) grinding the ore to reduce the particle size of the ore;

(b) preparing a slurry of the ground ore in sulfuric acid containing less than ten percent of water;

(c) adding water to the acid-ore slurry in an amount which is effective to initiate a sulfation reaction;

(d) allowing the sulfation reaction to continue, utilizing the heat of the sulfation reaction, whereby water-soluble metal sulfates are formed;

(e) leaching the sulfation product with water to extract the water-soluble metal sulfates;

(f) neutralizing the unreacted sulfuric acid;

(g) autoclaving the neutralized slurry under an oxidizing atmosphere to selectively precipitate iron;

(h) separating the resulting autoclaved metal sulfates solution from the insoluble residue;

(i) precipitating from the solution metals other than Mg;

(j) separating the Mg-containing solution from the precipitate;

(k) recovering nickel products from the precipitate;

(l) concentrating the separated solution sufficiently to precipitate calcium sulfate ($CaSO_4$); and (m) recovering Mg products from the concentrated solution.

There is provided in accordance with another aspect of the present invention, a process for the preparation of MgO from a solution of metal sulfates including $MgSO_4$, comprising the steps of:
(a) precipitating from the solution metals other than Mg as hydroxides;
(b) separating the solution from the precipitate;
(c) concentrating the separated solution to a specific gravity of from about 1.35 to 1.5, whereby impurities including calcium sulfate are precipitated;
(d) separating the concentrated solution from the precipitate;
(e) recovering dehydrated $MgSO_4$ crystals from the concentrated solution; and
(f) decomposing the dehydrated $MgSO_4$ crystals to form MgO. Preferably, the precipitation of the metal hydroxides comprises adding $Mg(OH)_2$ to the metal sulfates solution at a pH value of between about 6.5 and 8.5, and the concentration step is carried out at a temperature between about 40° C. and 90° C. The recovery step preferably comprises first crystallizing hydrated $MgSO_4$ and then dehydrating the crystallized $MgSO_4$.

In accordance with still another aspect of the invention, there has been provided a process for the preparation of high purity, high surface area MgO suitable for producing refractory materials, from a solution of metal sulfates including $MgSO_4$, comprising the steps of:
(a) precipitating from the solution metals other than Mg as hydroxides;
(b) separating the solution from the precipitate;
(c) concentrating the separated solution sufficiently to precipitate $CaSO_4$;
(d) separating the concentrated solution from the precipitate;
(e) recovering dehydrated $MgSO_4$ crystals from the concentrated solution; and
(f) decomposing the dehydrated $MgSO_4$ crystals by heating at a temperature between about 800° C. and 1000° C. in a reducing atmosphere, whereby high purity, high surface area MgO and sulfur-containing gases are formed.

Other objects, features and advantages of the invention will become apparent from the detailed description of preferred embodiments which follows, when considered together with the attached figure of drawing.

BRIEF DESCRIPTION OF THE DRAWING

The FIGURE of drawing is a flow diagram schematically representing the process according to the invention.

DETAILED DESCRIPTION OF PREFERRED EMBODIMENTS

A metal sulfates solution is formed by any suitable method from the laterite or any other type of magnesium-containing ore. Preferably, the ore is ground to $-65$ to $-100$ mesh by any mechanical means of producing powdered material. The ore is mixed with concentrated (about 100%) sulfuric acid. The preferable weight ratios of ore to acid are 1:1 to 1:1.1, depending on the ore being treated. Water is then added in amounts sufficient to trigger and sustain a self-sulfation reaction. About 10-20% water by weight appears to be the optimal amount. The reacting slurry is contained in a vessel such that the heat generated by the sulfation reaction will raise the temperature of the slurry to 15020 $-210°$ C., preferably 200° C. The reacted calcine is then leached with water at 30°-70° C., and preferably 60°-70° C., to produce the metals sulfate solution for further treatment. The above means of forming a metals sulfate solution in accordance with U.S. Pat. No. 4,125,588, which is hereby incorporated by reference, is preferred. Though the chemistry of the present invention does not exclude other methods of preparing the metals sulfate solution, the technology of U.S. Pat. No. 4,125,588 is followed because it guarantees high leaching of Ni and Mg with a minimum of silica dissolution. The low silica dissolution ensures a minimum requirement of precipitating agents such as $Mg(OH)_2$ or $NH_4OH$ and good settling characteristics in the subsequent purification steps.

From this point, the leached slurry may go directly into a solid-liquid separation step as indicated by arrow 1.

Alternatively, the leached slurry may be treated to selectively lower the iron content of the metals sulfate solution. This alternate treatment is indicated on the flow-chart by arrow 2. The unreacted sulfuric acid in the slurry is first neutralized. This may be accomplished advantageously by adding $-200$ mesh ore to the slurry and blending. The $-200$ mesh ore can be collected as dust in a cyclone during the grinding step. Though other sizes of ground ore may be used, the finer mesh ore significantly reduces abrasion in the subsequent steps. The $-200$ mesh ore is added in sufficient quantity to neuturalize the unreacted ore to a pH of about 2-3. An additional quantity of ore may be added in such an amount that the metal values thereof will be substantially sulfated by acid generated during the autoclave step. Iron is next precipitated by autoclaving the neutralized slurry at about 150°-170° C. under an oxygen atomsphere, preferably at about 150 psi. The autoclaved slurry then goes to the solid-liquid separation step.

The metals sulfate solution is separated from the gangue by any conventional solid-liquid separation technique to produce a solution of metal sulfates.

A suitable solid-liquid separation apparatus is a settler. Desirably, a flocculating agent is added. The solids settle, and are washed in a counter-current decantation circuit to recover the solubles, which are returned to the leaching circuit. The washed solids are discarded into a tailings pond.

The pregnant metal sulfates solution is then subjected to a first purification step in which impurities such as iron Fe, nickel Ni, silicates $SiO_2$, aluminum Al and cobalt Co are precipitated out by adjusting the pH to a value between about 6.5-8.5, and preferably between about 7-7.5. This can be accomplished by the addition of a base such as a metal hydroxide, or ammonium hydroxide. Preferably, a slurry of magnesium hydroxide $Mg(OH)_2$ is employed for this purpose. The bulk of the iron is precipitated as $Fe(OH)_2$, and some air oxidation can be imposed to guarantee the complete iron removal without filtering difficulties due to excessive precipitating as $Fe(OH)_3$.

The precipitate from the first purification step can be washed and treated hydometallurgically to recover Ni and Co separately, as indicated by arrow 3 on the flow-chart, or it can be fed to a smelter, via a Herreshoff furnace, to produce ferronickel, as indicated by arrow 4.

If the autoclaving step has been included, the iron concentration in the precipitate is greatly reduced. This allows the more economical hydrometallurgical recovery of nickel, or alternatively allows the recovery of a higher grade of ferronickel.

The pregnant $MgSO_4$ solution exiting from the first purification step with some impurities is fed to a second purification step in which the solution is concentrated by evaporation of water to a specific gravity in the range of from about 1.35 to 1.5 at a temperature in the range of about 40°–90° C. Preferably, the specific gravity is about 1.42. This operation can be performed within the stages of a multiple-stage crystallizing system. The magma or concentrated solution thus produced is filtered to separate the calcium sulfate $CaSO_4 \cdot \frac{1}{2}H_2O$ crystals crowded out the solution as a result of having exceeded the solubility product of calcium sulfate. Other insoluble and undesirable compounds such as borates and hydroxides of heavy metals are also removed by this filtration step.

This clean preconcentrated solution is then fed to a final crystallization stage to produce $MgSO_4 \cdot 6H_2O$ or other hydrated crystals. In this stage, the mother liquor is preferably recycled from the liquid outlet back to the inlet. The crystals produced in this step are dried to produce $MgSO_4$ as the feed for the production of high surface area MgO in a decomposer reactor.

The surface area of the oxide produced is very sensitive to the decomposition temperature, and for this reason a reducing atmosphere is necessary to chemically carry out the decomposition of the $MgSO_4$. The surface area of the MgO particularly depends on the reaction time, temperature, equivalent % CO, and the $CO-CO_2$ ratio. A reducing atmosphere is provided by utilizing, for example, an atmoshphere of nitrogen, carbon dioxide and carbon monoxide, preferably containing between about 5 to 20% equivalent CO. This decomposition can be carried out in a rotary kiln, a Herreshoff furnace or any other convenient reactor. The reducing atmosphere itself can be produced as the combustion product of the fuel used to heat the reactor. Decomposition is carried out at a temperature of between about 800° C. and 1000° C. During this decomposition (light burning), $H_2S$ and S vapor are produced which need to be burned to $SO_2$ along the length of the reactor or in a hot cyclone before being sent to the acid plant to be converted to sulfuric acid. Air or oxygen-enriched air can be used to increase the $SO_2$ strength in the gas stream to the acid plant. The $H_2SO_4$ may then be used in the sulfation step.

By this decomposition step it is possible to produce magnesium oxide having a sufficiently high surface area (e.g., between about 7 and 50 $m^2/g$) that it allows successful briquetting and densification upon dead burning without the use of additives, in order to produce satisfactory refractory materials. A portion of this MgO may be used to form $Mg(OH)_2$ for use in the first purification step.

The production of such refractory materials is carried out in accordance with conventional techniques, as indicated by arrow 5 on the flow-chart. Densification of the MgO is accomplished by briquetting at a pressure of between about 15,000 and 30,000 psi and dead burning at a temperature between about 2000° C. and 2200° C., typically at about 2100° C. Refractory products having densities of between about 3.0 g/cc and 3.5 g/cc are obtained from the high purity, high surface area MgO produced according to the present invention. The product is more pure than prior art refractory MgO, which is made with additives. Moreover, higher density MgO, i.e., density in excess of 3.4 g/cc, is possible with this invention.

Alternatively, the MgO formed in the decomposition step may be used to form Mg metal, as indicated by arrow 6 on the flow-chart. The MgO is briquetted with carbon, such as coal. It is then burned in a shaft kiln with chlorine gas to form molten magnesium chloride. The $MgCl_2$ is subsequently electrolyzed to form Mg metal and chlorine gas.

The entire process of this invention may be referred to as the MAGNI process.

In order to more fully illustrate the present invention, the following non-limiting examples are provided.

EXAMPLE 1

A very refractory material such as the Riddle laterite rejects can be successfully treated. This material analysis approximately 0.7% Ni, 0.04% Co, 0.5% Cr, 6.5% Fe, 36% MgO, 48% $SiO_2$ and 6% loss on ignition.

This ore is dry ground to $-100$ mesh. The ground ore is mixed with 1.1 times its weight of $H_2SO_4$ of 100% concentration. Water is then added to the acid-ore slurry in an amount of about 10 to 20% the weight of the ore to trigger the sulfation reaction. This reaction is allowed to proceed in either a conveyor belt, a pug mill or within a storage bin so that the heat generated will bring the temperature to 150°–210° C. The reacted calcine is then leached with water at 30°–70° C. to produce the metals sulfate solution for further treatment.

The slurry produced by water leaching goes into a solid-liquid separation step in a settler. The suspended solids are then flocculated with any suitable commercial flocculant, as with Jaguar C-13, a cationic flocculant manufactured by the Stein-Hall Corp., used at the rate of about 0.05 lb. per ton of ore treated.

The solids settle to a terminal pulp density of about 30% solids for solution-to-calcine weight ratios as low as 1.25:1. These solids are washed in a counter-current decantation circuit to recover the solubles which are then returned to the leaching circuit. The washed solids are discarded into a tailings pond.

The solution overflow from the settler is then treated with a 30% $Mg(OH)_2$ slurry in mixing tanks to maintain the pH=7-7.5 in the temperature range of 50°–90° C. Iron, nickel, silica, alumina, and other impurities are precipitated as hydroxides, silicates, aluminates, etc. This precipitate is separated using a vacuum filter or any other suitable solid-liquid separation equipment. The filter cake can be treated hydrometallurgally to recover Ni and Co separately or it can be dried and smelted to produce ferronickel.

The filtrate is concentrated to a specific gravity of about 1.42 whereby calcium sulfate is precipitated together with some borates and other residual heavy metals as hydroxides. This precipitate is filtered using a pressure filter and the filtrate is advanced to another stage of the evaporative crystallizer system to finally produce $MgSO_4 \cdot 6H_2O$ crystals. These crystals are dehydrated at 250° C. in a suitable drier to yield $MgSO_4$.

The anhydrous magnesium sulfate is then fed to a decomposer reactor to generate MgO and $SO_2$.

The $SO_2$ so generated is sent to the acid plant to produce the acid necessary for the leaching step. The decomposer is operated in the temperature range of 800°–1000° C. and preferably at 850°–900° C. under a reducing atmosphere containing primarily hydrogen and carbon monoxide as the reducing species. The fuel to generate the reducing gas could be fuel oil, natural gas, or any other fuel of sufficient calorific power to perform the decomposition of $MgSO_4$ without generating a weak stream of $SO_2$ not appropriate for the economical making of $H_2SO_4$. Also the fuel should not contaminate the MgO with excessive amounts of $SiO_2$, $Fe_2O_3$, $Al_2O_3$, etc. The main purpose of the reducing atmosphere is to allow the decomposition to proceed at low temperatures with negligible sintering effect so that MgO of high surface areas can be generated. Under very reducing conditions the production of $H_2S$ and S vapor are unavoidable and for this reason the atmosphere inside the reactor is controlled along its length so that the exit gas will contain only $SO_2$ as the S bearing species. The reactor to perform this decomposition could be a rotary kiln, a Herreshoff furnace or any other convenient ractor. Typical reactions taking place are:

$$MgSO_4 + CO \rightleftharpoons MgO + SO_2 + CO_2$$

$$MgSO_4 + H_2 \rightleftharpoons MgO + SO_2 + H_2O_{(v)}$$

If the decomposition is performed at 850° C. a surface area of about 50 m²/g can be obtained while it is only 2.5 m²/g if the decomposition is performed at 1100° C. Surface area is measured in a Quantasorb apparatus, manufactured by Quantachrome Corp., using a single point $N_2$ adsorption method. This temperature effect is, of course, tied with the residence time necessary to achieve a given residual sulfur in the produced MgO. The shorter the time spent at any given temperature the higher the specific area of the MgO.

This MgO will be the counterpart of the light burned MgO produced by calcining $Mg(OH)_2$ according to the general industrial practice. The MgO from the decomposition reactor can be called "light burned" only in that it has been exposed to the same temperature range but subjected to a different chemistry. So, it is a special light burned material. This material is then briquetted and subjected to a dead burned calcination according to the industrial practice in a shaft furnace at around 2100° C. to generate periclase of high density.

The special light burned MgO is not only suitable for making high density refractory grade periclase, but also can be treated with carbonaceous materials and chlorine in a shaft furnace to produce molten $MgCl_2$ as the feed to electrolytic cells generating metallic magnesium.

EXAMPLE 2

Riddle laterite rejects are dry ground to about −100 mesh. The resulting −200 mesh dust is collected, and a portion is retained. The remainder is combined with the ground ore. The ground ore is mixed with 1.1 times its weight of $H_2SO_4$ of 100% concentration. Water is then added to the acid-ore slurry in an amount of about 10% to 20% the weight of the ore to trigger the sulfation reaction. Sulfation and water leaching proceed as in Example 1.

The retained −200 mesh ore is added to the slurry produced by water leaching in sufficient quantity to neutralize the remaining unreacted sulphuric acid, with a slight excess of ore. The slurry, having a pH of 2-3, is then treated in an autoclave at about 150° C. under about 150 psi of $O_2$ gas to precipitate the iron as $Fe(OH)_3$ and geothite, $FeO.OH$. The pH of the autoclaved slurry is about 1.5, due to acid generated during the autoclaving step.

The slurry is next processed in a settler, where the suspended solids are flocculated. The solids are washed in a counter-current decantation circuit to recover the solubles, which are then returned to the leaching circuit. The washed solids are discarded into a tailings pond.

The solution overflow from the settler is treated with a 30% $Mg(OH)_2$ slurry in mixing tanks to maintain the pH at 7-7.5 in the temperature range of 50°-90° C. Nickel and iron hydroxides and various impurities are precipitated. This precipitate is separated using a pressure filter or any other suitable liquid-solid separation equipment. The precipitate has a much higher nickel grade than the precipitate in Example 1, as much of the iron was removed in the autoclave step.

The precipitate is washed in a counter-current decantation circuit, and the solubles are added to the $Mg(OH)_2$ slurry. The precipitate is then treated hydrometallurgically to recover nickel. Alternatively, the filter cake is dried in a Herreshoff furnace and smelted in an electric furnace to produce ferronickel.

The filtrate is further processed as in Example 1 to produce high surface area MgO.

EXAMPLE 3

To demonstrate the purity of the product by the first purification step, a 100 lb/hr pilot plant is run without the second purification step and the $MgSO_4$ crystals are decomposed at 1100° C. The chemical purity of the MgO produced is as follows:

| ASSAY (wt. %) | | | | | |
|---|---|---|---|---|---|
| $Fe_2O_3$ | = | 0.078 | CaO | = | 0.432 |
| $Al_2O_3$ | = | 0.005 | $Na_2O$ | = | 0.002 |
| $SiO_2$ | = | 0.036 | $K_2O$ | = | 0.001 |
| NiO | = | 0.011 | S | = | 0.1--0.5* |
| $B_2O_3$ | = | 0.003 | LOI | = | 0.22** |
| $Cr_2O_3$ | = | 0.02 | MgO | = | Balance |

*This S is eliminated during the dead burning.
**Lost on ignition.

EXAMPLE 4

In order to demonstrate that the second purification step according to the invention eliminates additional impurities, a 1500 lb pregnant $MgSO_4$ solution is preconcentrated to specific gravity 1.4 at 60° C., and the magma is filtered. The filter cake is washed, dried and analyzed for CaO and $B_2O_3$ with the following results:

| Second Purification Step Filter Cake Assay | |
|---|---|
| CaO | $B_2O_3$ |
| 21.83% | 12 ppm |

The above CaO analysis corresponds to Plaster of Paris or $CaSO_4.\frac{1}{2}H_2O$. The color of the cake indicates other impurities as well, especially $Fe(OH)_3$, but these are not analyzed.

The analysis of the clean pregnant $MgSO_4$ solution demonstrates it to be a feed solution for producing MgO with the following levels of impurities:

| Second Purification Step Clean MgO Assay: % | | | |
|---|---|---|---|
| Fe$_2$O$_3$ | NiO | SiO$_2$ | CaO |
| 0.001 | 0.002 | 0.005 | 0.107 |

This is "high purity" MgO.

Thus, Fe$_2$O$_3$, NiO, SiO$_2$ are reduced to approximately 1.3%, 20%, 14%, and 25% respectively, of their values before the second purification step.

EXAMPLE 5

To demonstrate the generation of surface area necessary for good briquetting and dead burning densification, MgSO$_4$ is decomposed in an atmosphere of N$_2$, CO$_2$ and CO, containing 13.3 and 20% CO, at different temperatures, for two hours. The results are summarized below:

| PHYSICAL CONDITIONS | | MgO CHARACTERISTICS | |
|---|---|---|---|
| Temperature | | | Surface Area |
| °C. | % CO | % S | m$^2$/g | Average |
| 850 | 13.3 | 0.6 | 39.2 | 41.0 |
| 850 | 13.3 | 0.4 | 42.8 | |
| 900 | 20.0 | 0.2 | 27.2 | 29.1 |
| 900 | 20.0 | 0.4 | 31.1 | |
| 950 | 13.3 | 0.4 | 14.0 | |
| 950 | 13.3 | 0.56 | 13.1 | |
| 950 | 13.3 | 0.28 | 12.9 | 12.9 |
| 950 | 13.3 | 0.22 | 11.7 | |
| 1000 | 20.0 | 0.20 | 10.9 | 11.6 |
| 1000 | 20.0 | 0.19 | 12.3 | |
| 1050 | 13.3 | 0.2 | 8.5 | 8.1 |
| 1050 | 13.3 | 0.17 | 7.6 | |

EXAMPLE 6

A refractory material is prepared as follows: Densification of the MgO is accomplished by briquetting and dead burning at 1650° and 1870° C., with the following results:

| Light Burning Temperature, °C. | Briquetting Pressure, PSI | DEAD BURNING CONDITIONS | | Density g/cc |
|---|---|---|---|---|
| | | Temperature °C. | Time, Min. | |
| 900 | 25,000 | 1,650 | 90 | 3.28 |
| 900 | 25,000 | 1,870 | 60 | 3.38 |
| 950 | 25,000 | 1,650 | 90 | 3.16 |
| 950 | 25,000 | 1,870 | 60 | 3.33 |
| 975 | 25,000 | 1,650 | 90 | 2.92 |

These results clearly indicate that by dead burning at 2100° C., as it is done industrially, densities in excess of 3.4 are obtainable.

What is claimed is:

1. A process for the preparation of high surface area, high purity MgO from a solution of: sulfates of Mg, Ca, and other metals selected from the group consisting of Fe, Ni, Co, and Al; and impurities including B and Si, comprising the steps of:
   (a) precipitating from the solution said other metals as hydroxides;
   (b) separating the solution from the precipitate;
   (c) concentrating the separated solution to a specific gravity of from about 1.35 to 1.5, whereby Ca, B, Si and residual impurities are precipitated;
   (d) separating the concentrated solution from the precipitate;
   (e) recovering dehydrated MgSO$_4$ crystals from the concentrated solution; and
   (f) decomposing the dehydrated MgSO$_4$ crystals to form high purity MgO suitable for producing refractory materials.

2. The process as defined by claim 1, wherein the precipitation of the metal hydroxides comprises adding Mg(OH)$_2$ to the metal sulfates solution.

3. The process as defined by claim 2 or 1, further comprising adjusting the pH of the metal sulfate during said precipitation step to a value between about 6.5 and 8.5.

4. The process as defined by claim 3, wherein said pH of the metal sulfates solution is adjusted to a value between about 7 and 7.5.

5. The process as defined by claim 4, further comprising exposing the metal sulfates solution to air oxidation while the metal hydroxides are being precipitated.

6. The process as defined by claim 1, comprising concentrating the separated solution at a temperature between about 40° C. and 90° C.

7. The process as defined by claim 6, wherein the separated solution is concentrated to a specific gravity of about 1.42.

8. The process as defined by claim 1, wherein the step of recovering the dehydrated MgSO$_4$ from the concentrated solution comprises first crystallizing hydrated MgSO$_4$ and then dehydrating the crystallized MgSO$_4$.

9. A process for the preparation of high purity, high surface area MgO suitable for producing refractory materials, from a solution of: sulfates of Mg, Ca, and other metals selected from the group consisting of Fe, Ni, Co, and Al; and impurities including B and Si, comprising the steps of:
   (a) precipitating from the solution said other metals as hydroxides;
   (b) separating the solution from the precipitate;
   (c) concentrating the separated solution sufficiently to precipitate CaSO$_4$;
   (d) separating the concentrated solution from the precipitate;
   (e) recovering dehydrated MgSO$_4$ crystals from the concentrated solution; and
   (f) decomposing the dehydrated MgSO$_4$ crystals to form high purity MgO having a controlled surface area of between about 7 and 50 m$^2$/g, by heating at a temperature between about 800° C. and 1000° C. in a reducing atmosphere.

10. The process as defined by claim 9, wherein the decomposition step also produces sulfur-containing gases, further comprising the step of burning the sulfur-containing gases to SO$_2$ gas.

11. The process as defined by claim 10, further comprising recycling the SO$_2$ gas to form H$_2$SO$_4$.

12. The process as defined by claim 9, wherein the concentrating step comprises concentrating the separated solution to a specific gravity of from about 1.35 to 1.5, whereby impurities including calcium sulfate are precipitated.

13. The process as defined by claim 12, further comprising concentrating the separated solution at a temperature between about 40° C. and 90° C.

14. The process as defined by claim 9, wherein the reducing atmosphere comprises CO and H$_2$.

15. The process as defined by claim 9, wherein the separated solution is concentrated to a specific gravity of about 1.42.

16. The process as defined by claim 9, further comprising the steps of:
(g) briquetting the MgO; and
(h) dead burning the briquetted MgO at temperatures greater than about 2000° C., whereby refractory MgO is produced.

17. The process as defined by claim 9, further comprising the steps of:
(g) briquetting the MgO combined with carbon;
(h) heating the briquetted MgO in a kiln in an atmosphere of chlorine; and
(i) electrolyzing the resulting $MgCl_2$, whereby Mg metal is produced.

18. A process for refining a magnesium, calcium, iron and nickel containing ore, comprising the steps of:
(a) grinding the ore;
(b) preparing a slurry of the ground ore in sulfuric acid containing less than ten percent of water;
(c) adding water to the acid-ore slurry in an amount which is effective to initiate a sulfation reaction;
(d) allowing the sulfation reaction to continue, utilizing the heat of the sulfation reaction to heat the acid-ore slurry, whereby water-soluble metal sulfates and insoluble residue are formed;
(e) leaching the sulfation product with water to extract the water-soluble metal sulfates in solution;
(f) separating the metal sulfates solution from the insoluble residue;
(g) precipitating from the solution iron and nickel as hydroxides;
(h) separating the solution from iron and nickel hydroxide precipitate;
(i) concentrating the solution sufficiently to precipitate $CaSO_4$;
(j) separating the concentrated solution from the precipitate;
(k) recovering dehydrated $MgSO_4$ crystals from the concentrated solution; and
(l) decomposing the dehydrated $MgSO_4$ crystals to form high purity, high surface area MgO.

19. The process as defined by claim 18, further comprising the steps of:
neutralizing the unreacted sulfuric acid in the metal sulfates solution; and
selectively precipitating iron from the neutralized solution by autoclaving said solution under an oxygen atmosphere.

20. The process as defined by claim 19, wherein the neutralization is effected by adding ground ore to the metal sulfates solution.

21. The process as defined by claim 18, further comprising smelting the metal hydroxide precipitate to form ferronickel.

22. The process as defined by claim 18, further comprising hydrometallurgically separating nickel from the iron and nickel hydroxide precipitate.

* * * * *